(12) United States Patent
Zhang

(10) Patent No.: US 12,013,000 B2
(45) Date of Patent: Jun. 18, 2024

(54) VEHICLE STEERING SYSTEM AND VEHICLE

(71) Applicant: BYD COMPANY LIMITED, Guangdong (CN)

(72) Inventor: Peng Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 193 days.

(21) Appl. No.: 17/780,827

(22) PCT Filed: Oct. 27, 2020

(86) PCT No.: PCT/CN2020/124106
§ 371 (c)(1),
(2) Date: Feb. 17, 2023

(87) PCT Pub. No.: WO2021/103899
PCT Pub. Date: Jun. 3, 2021

(65) Prior Publication Data
US 2023/0220884 A1   Jul. 13, 2023

(30) Foreign Application Priority Data
Nov. 29, 2019   (CN) .......................... 201911206807.X

(51) Int. Cl.
*F16D 23/14*   (2006.01)
*F16D 11/14*   (2006.01)
*B60R 25/022*   (2013.01)

(52) U.S. Cl.
CPC .............. *F16D 23/14* (2013.01); *F16D 11/14* (2013.01); *B60R 25/0222* (2013.01)

(58) Field of Classification Search
CPC ....... F16D 23/14; F16D 11/14; B60R 25/0222
See application file for complete search history.

(56) References Cited

U.S. PATENT DOCUMENTS

| | | |
|---|---|---|
| 5,836,419 A * | 11/1998 | Shimizu ................... B62D 5/04 180/443 |
| 10,703,405 B2 * | 7/2020 | Kodera ................. B62D 5/0421 |

(Continued)

FOREIGN PATENT DOCUMENTS

| | | |
|---|---|---|
| CN | 104616559 A | 5/2015 |
| CN | 107031699 A | 8/2017 |

(Continued)

OTHER PUBLICATIONS

English Translation of International Search Report from PCT/CN2020/124106 dated Jan. 27, 2021 (3 pages).

*Primary Examiner* — Faye M Fleming
(74) *Attorney, Agent, or Firm* — Calfee, Halter & Griswold LLP

(57) ABSTRACT

A vehicle steering system and a vehicle are provided. The vehicle steering system includes a steering shaft and a steering transmission shaft. The steering shaft or the steering transmission shaft includes a first shaft section and a second shaft section. A clutch mechanism is arranged between the first shaft section and the second shaft section. In an engaging state, a transmission connection is established between the first shaft section and the second shaft section, and in this case, a controller determines that the vehicle enters a driving mode. In a disengaging state, the transmission connection between the first shaft section and the second shaft section is disconnected, and in this case, the controller determines that the vehicle enters a game mode.

20 Claims, 9 Drawing Sheets

(56) References Cited

U.S. PATENT DOCUMENTS

| | | | | |
|---|---|---|---|---|
| 2005/0155809 | A1 | 7/2005 | Krzesicki et al. | |
| 2008/0149412 | A1* | 6/2008 | Osanai | F16D 27/102 |
| | | | | 180/443 |
| 2018/0244304 | A1* | 8/2018 | Sakamaki | B62D 5/0433 |
| 2023/0339531 | A1* | 10/2023 | Zhang | B62D 1/16 |

FOREIGN PATENT DOCUMENTS

| | | | | | |
|---|---|---|---|---|---|
| CN | 107719463 | A | | 2/2018 | |
| CN | 107813862 | A | | 3/2018 | |
| CN | 108454690 | A | | 8/2018 | |
| CN | 208915256 | U | | 5/2019 | |
| CN | 110001751 | A | | 7/2019 | |
| CN | 110368681 | A | | 10/2019 | |
| CN | 110368682 | A | | 10/2019 | |
| CN | 211336154 | U | | 8/2020 | |
| CN | 211336155 | U | | 8/2020 | |
| CN | 112874626 | B | * | 5/2022 | B62D 3/02 |
| DE | 4110148 | | | 10/1991 | |
| DE | 102011110701 | A1 | | 2/2013 | |
| DE | 102017220769 | A1 | | 6/2019 | |
| JP | 2005087580 | A | | 4/2005 | |
| JP | 2006062527 | A | | 3/2006 | |
| KR | 20230098310 | A | * | 7/2023 | |
| WO | 2012139622 | A2 | | 10/2012 | |

\* cited by examiner

VEHICLE STEERING SYSTEM AND VEHICLE

CROSS-REFERENCE TO RELATED APPLICATIONS

This application is the National Stage application of PCT International Application No. PCT/CN2020/124106, filed on Oct. 27, 2020, which claims priority to Chinese Patent Application No. 201911206807.X filed on Nov. 29, 2019, which are incorporated herein by reference in their entireties.

FIELD

The present disclosure relates to the field of vehicle technologies, and specifically, to a vehicle steering system and a vehicle.

BACKGROUND

In a vehicle, a steering column is a connecting part mounted between a steering wheel and a steering gear, is mainly used to control a traveling direction of the vehicle, transmit a torque, and absorb energy during a collision of the vehicle, and is an important component of a vehicle steering system.

In the related art, a steering shaft at an input end of the steering column is connected to the steering wheel, and a steering shaft at an output end of the steering column is connected to the steering gear. During steering, the torque is transmitted to the steering gear through the steering column by manipulating the steering wheel to implement the steering of the vehicle.

SUMMARY

An objective of the present disclosure is to provide a vehicle steering system and a vehicle. The vehicle steering system can implement engagement and disengagement between a steering wheel and a steering gear, to provide the vehicle with a real vehicle driving mode and a simulated driving mode.

To achieve the objective, the present disclosure provides a vehicle steering system. The vehicle steering system includes a steering shaft and a steering transmission shaft. The steering shaft or the steering transmission shaft includes a first shaft section and a second shaft section. A clutch mechanism is arranged between the first shaft section and the second shaft section. The clutch mechanism has an engaging state and a disengaging state. One of the first shaft section and the second shaft section is movable in an axial direction relative to the other under the action of an external force, to implement switching between the engaging state and the disengaging state. In the engaging state, a transmission connection is established between the first shaft section and the second shaft section, and in this case, a controller determines that a vehicle enters a driving mode. In the disengaging state, the transmission connection between the first shaft section and the second shaft section is disconnected, and in this case, the controller determines that the vehicle enters a game mode.

In some embodiments, the second shaft section is fixedly disposed relative to a steering column. The first shaft section is movable in the axial direction relative to the second shaft section and the steering column. The clutch mechanism includes a guide structure. The guide structure constrains and guides the first shaft section to move in the axial direction.

In some embodiments, the steering shaft includes an upper shaft and a lower shaft. An upper end of the upper shaft is connected to a steering wheel. A lower end of the lower shaft is connected to the steering transmission shaft. The guide structure is provided in the steering column. The upper shaft is used as the first shaft section. The lower shaft is used as the second shaft section. The upper shaft and the lower shaft are connected by the clutch mechanism. Alternatively, a lower end of the upper shaft and an upper end of the lower shaft are in a transmission connection. The upper shaft is movable in the axial direction relative to the lower shaft. The lower shaft includes the first shaft section and the second shaft section. An upper end of the first shaft section is connected to the upper shaft. A lower end of the first shaft section is connected to an upper end of the second shaft section by the clutch mechanism, and the first shaft section is movable in the axial direction relative to the second shaft section. Alternatively, the upper shaft includes the first shaft section and the second shaft section. An upper end of the second shaft section is connected to the steering wheel. A lower end of the second shaft section is connected to an upper end of the first shaft section by the clutch mechanism. The first shaft section is movable in the axial direction relative to the second shaft section.

In some embodiments, the guide structure includes a sliding sleeve. The sliding sleeve is arranged in the steering column and is movable in the axial direction. A lateral movement of the sliding sleeve relative to the steering column is limited. A first bearing is fixed at the lower end of the first shaft section. The first shaft section is supported in the sliding sleeve by the first bearing. The vehicle steering system includes a clutch drive mechanism. The clutch drive mechanism drives the sliding sleeve to move, to cause the first shaft section to move in the axial direction.

In some embodiments, the first shaft section is movable in the axial direction relative to the sliding sleeve. A radially inward stop rim is disposed at a port of the sliding sleeve facing the second shaft section and is used to stop the first bearing. An elastic biasing member is arranged in the steering column, to press the first bearing towards the stop rim.

In some embodiments, the guide structure includes a stopper. The stopper is fixed at an upper end portion of the sliding sleeve, or the stopper is fixed at the steering column. One end of the elastic biasing member abuts against the first bearing, and the other end abuts against the stopper.

In some embodiments, the first shaft section and the sliding sleeve are relatively fixed in the axial direction.

In some embodiments, an outer ring of the first bearing is interference fit in the sliding sleeve.

In some embodiments, the clutch mechanism includes a limiting structure. The limiting structure constrains a movement stroke of the sliding sleeve in the axial direction.

In some embodiments, the clutch drive mechanism includes an actuating device and a transmission device. The actuating device is arranged on an outer side of the steering column. The actuating device passes through an avoidance hole through the transmission device. The avoidance hole is provided in the steering column. The actuating device is connected to the sliding sleeve in a transmission manner. The actuating device drives the sliding sleeve to move.

In some embodiments, the clutch mechanism includes a clutch structure. The clutch structure includes a male engagement portion and a female engagement portion mated with each other. One of the male engagement portion and the female engagement portion is formed at the lower end of the first shaft section. The other of the male engagement portion and the female engagement portion is formed at the upper end of the second shaft section. When the male engagement portion and the female engagement portion are engaged, the first shaft section and the second shaft section are in the engaging state.

Based on the above technical solution, the present disclosure further provides a vehicle. The vehicle includes the foregoing vehicle steering system.

Through the above technical solution, during working, the vehicle steering system provided by the present disclosure drives a first shaft section to move downward in an axial direction relative to a second shaft section under the action of an external force, so that a clutch mechanism is in an engaging state. In this case, a transmission connection is established between the first shaft section and the second shaft section. A torque of a driver manipulating a steering wheel is transmitted to a steering gear through an upper shaft, the first shaft section, the second shaft section, and a transmission shaft, to implement the steering of the vehicle. Under the action of the external force, the first shaft section is driven to move upward in the axial direction relative to the second shaft section, so that the clutch structure is in a disengaging state. In this case, the transmission connection between the first shaft section and the second shaft section is disconnected, and the steering wheel and the steering gear are in a disconnected state. In this case, the turning of the steering wheel cannot make the steering gear work, but the steering wheel can still drive a combination switch, a clock spring, an angle sensor, and another part to operate normally. The steering wheel in this state can be used as a simulator for driving the vehicle, and can output an angle signal of the steering wheel to an in-vehicle device or an external device, to implement simulated driving.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DETAILED DESCRIPTION

The following describes the specific implementations of the present disclosure in detail with reference to the accompanying drawings. It should be understood that the specific implementations described herein are merely used to describe and explain the present disclosure, but are not intended to limit the present disclosure.

In the present disclosure, unless otherwise stated, directional words used such as "up and down" are defined on the basis of a vehicle, and "up and down" refer to corresponding upper and lower positions in a height direction of the vehicle. In addition, "in and out" are "in and out" relative to a contour of a corresponding part. Furthermore, terms such as "first and second" are used in the present disclosure to distinguish an element from another element, and are not of sequence or importance. Furthermore, in the following description, when the drawings are referred to, unless otherwise explained, same drawing numerals in different drawings represent same or similar elements. The above definitions are only used to explain and illustrate the present disclosure, and should not be understood as limiting the present disclosure.

Generally, in a vehicle steering system, a rotation inputted by a steering wheel needs to be transmitted downward to a steering gear through a steering shaft and a steering transmission shaft, so that a vehicle is steered accordingly.

Figure 16:
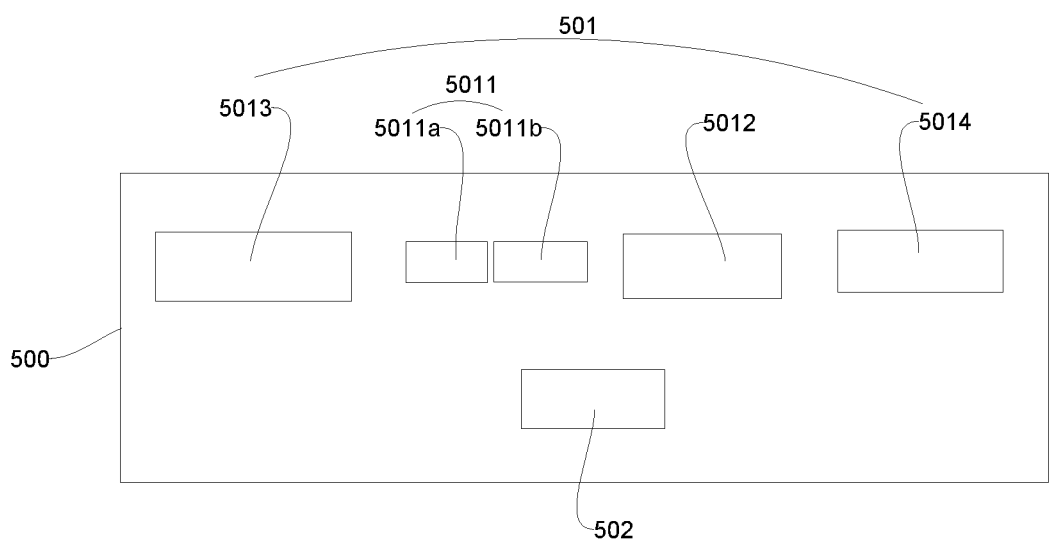
FIG. 16 is a schematic block diagram of a vehicle according to an embodiment of the present disclosure.

The present disclosure provides a different inventive concept, that is, in a vehicle steering system provided by the present disclosure, a rotation of a steering wheel may be selectively transmitted to a steering gear, to cause a vehicle to be steered accordingly. For this, as shown in FIG. 16, in a vehicle steering system 501 provided in the present disclosure, the steering shaft 5011 or the steering transmission shaft 5012 includes a first shaft section 102 and a second shaft section 103. A clutch mechanism is arranged between the first shaft section 102 and the second shaft section 103. The clutch mechanism has an engaging state and a disengaging state. One of the first shaft section 102 and the second shaft section 103 is movable in an axial direction relative to the other under the action of an external force, to implement switching between the engaging state and the disengaging state.

In the engaging state, a transmission connection is established between the first shaft section 102 and the second shaft section 103, and in this case, a controller 502 determines that a vehicle 500 enters a driving mode; In this case, a rotation inputted by a steering wheel 5013 is transmitted downward to a steering gear 5014 through the steering shaft 5011 and the steering transmission shaft 5012, to cause the vehicle 500 to be steered accordingly.

In the disengaging state, the transmission connection between the first shaft section 102 and the second shaft section 103 is disconnected, and in this case, the controller 502 determines that the vehicle 500 enters a game mode. In this case, the rotation of the steering wheel 5013 is no longer transmitted to the steering shaft 5011, but the rotation of the steering wheel 5013 can still drive a combination switch, a clock spring, an angle sensor, and another part to operate normally. The steering wheel 5013 in this state can be used as a simulator for driving the vehicle 500, and may output an angle signal of the steering wheel 5013 to an in-vehicle device or an external device. In this case, the controller 502 of the vehicle 500 determines that the vehicle 500 enters the game mode.

Generally, in the vehicle steering system 501, the steering wheel 5013, the steering shaft 5011, the steering transmission shaft 5012, and the steering gear 5014 are usually connected in sequence. Therefore, the clutch mechanism provided in the present disclosure may be arranged on the steering shaft 5011 or the steering transmission shaft 5012. The steering shaft 5011 is generally constructed in two manners. In one manner, the steering shaft is one whole shaft. An upper end of the steering shaft is connected to the steering wheel 5013. A lower end is connected to the steering transmission shaft 5012. In the other manner, the steering shaft includes two shafts (that is, an upper shaft 5011a and a lower shaft 5011b mentioned below). A connection manner between the two shafts can transmit the rotation from the steering wheel 5013 downward to the steering transmission shaft 5012, and in addition, the two shafts are allowed to move in an axial direction toward or away from each other, to allow a height position of the steering wheel 5013 to be adjusted, so that drivers of different heights and sizes can drive in a comfortable posture, thereby improving user experience.

Then, to enable the driver to drive the vehicle 500 in a comfortable posture, in some specific implementations provided in the present disclosure, the steering shaft 5011 may include the upper shaft 5011a and the lower shaft 5011b. An upper end of the upper shaft 5011a is configured to be connected to the steering wheel 5013. A lower end of the lower shaft 5011b is configured to be connected to the steering transmission shaft 5012. A lower end of the upper shaft 5011a and an upper end of the lower shaft 5011b are in a transmission connection (for example, connected by a spline structure). The upper shaft 5011a is movable in the axial direction relative to the lower shaft 5011b. In this way, a height adjustment of the steering wheel 5013 can be implemented, and the structural support is provided for the first shaft section 102 to move in the axial direction described below. To constrain the movement of the upper shaft 5011a in the axial direction along a same path, a guide structure may be provided in a steering column 105.

In these implementations, the clutch mechanism may be arranged in an appropriate position according to an actual requirement. In some embodiments, the upper shaft 5011a is used as the first shaft section 102. The lower shaft 5011b is used as the second shaft section 103. The upper shaft 5011a and the lower shaft 5011b are connected by the clutch mechanism. In this case, an upper end of the upper shaft 5011a is connected to the steering wheel 5013. The lower end of the upper shaft 5011a is connected to an upper end of the lower shaft 5011b by the clutch mechanism. The upper shaft 5011a is movable in the axial direction relative to the lower shaft 5011b. In some other embodiments, the clutch mechanism is arranged on the lower shaft 5011b. In this case, to facilitate the arrangement of the clutch mechanism, the lower shaft 5011b includes the first shaft section 102 and the second shaft section 103. An upper end of the first shaft section 102 is connected to the upper shaft 5011a. A lower end of the first shaft section 102 is connected to an upper end of the second shaft section 103 by the clutch mechanism. The first shaft section 102 is movable in the axial direction relative to the second shaft section 103. In some other embodiments, the clutch mechanism is arranged on the upper shaft 5011a. In this case, the upper shaft 5011a includes the first shaft section 102 and the second shaft section 103. An upper end of the second shaft section 103 is configured to be connected to the steering wheel 5013. A lower end of the second shaft section 103 is connected to an upper end of the first shaft section 102 by the clutch mechanism. The first shaft section 102 is movable in the axial direction relative to the second shaft section 103. Under the action of an external force, the first shaft section 102 moves up and down in the axial direction relative to the second shaft section 103, to implement switching between the engaging state and the disengaging state of the first shaft section 102 and the second shaft section 103, so that a user can make a choice as required when using the vehicle 500.

The clutch mechanism may include a clutch structure, and a selective transmission connection between the first shaft section 102 and the second shaft section 103 is implemented by using the clutch structure. The clutch structure may be constructed and implemented in any appropriate manner, for example, may be constructed as a spline structure, a cross protrusion and groove structure, or a special-shaped protrusion or groove structure. In this regard, the present disclosure does not make a specific limitation, and an appropriate manner may be selected according to an actual requirement for implementation and construction.

In a specific implementation of the present disclosure, a guide structure may be provided in the clutch mechanism. The guide structure constrains the first shaft section 102 (that is, a movable shaft section) to move along the same path, to prevent the first shaft section 102 from tilting during movement. The guide structure may be constructed and implemented in any appropriate manner. For example, an inner wall of the steering column 105 may be directly used to constrain a movement path of the first shaft section 102, and then the inner wall of the steering column 105 is used as the guide structure. A guide member may be added in the steering column 105. The guide member is movable in the axial direction, to guide the first shaft section 102 to move in the axial direction. However, a lateral movement of the guide member relative to the steering column 105 is limited to limit that the guide member has a unique movement path in the steering column 105. Based on this, the guide member may have various implementations and construction manners. For example, a sliding sleeve 106 described in the following embodiment may be supported on the inner wall of the steering column 105 by a sliding bearing 1010, or may be sleeved in another sleeve (the sleeve is fixed relative to the steering column 105). In this case, a transmission device in the foregoing clutch drive mechanism may need to pass through the steering column 105 and the sleeve to reach the guide member, to cause the first shaft section 102 to move in the axial direction. In another example, the guide member may be constructed in a non-tubular shape, for example, a bar shape, that is, a different construction manner from the circumferential sliding sleeve 106 surrounding the entire first shaft section 102. In this regard, the present disclosure does not make a specific limitation, and an appropriate manner may be selected according to an actual requirement for implementation and construction. In addition, relative to the guide member, the first shaft section 102 may be movable in the axial direction, or may not be movable in the axial direction. That is, the first shaft section is axially fixed relative to the guide member. However, the first shaft section 102 can rotate relative to the guide member, to ensure the transmission of a rotation.

In addition, in a specific implementation of the present disclosure, the limiting mechanism may be disposed in the steering system. The limiting mechanism constrains a movement stroke of the first shaft section 102 in the axial direction, to prevent the first shaft section from getting out of control. The limiting mechanism may be constructed and implemented in any appropriate manner. For example, the limiting mechanism may be disposed by directly constraining the movement stroke of the first shaft section 102. Then, in a specific implementation, a stop protrusion may be disposed on the steering column 105, and a long groove extending in the axial direction is provided in the first shaft section 102 (and vice versa). The stroke of the first shaft section 102 is limited through cooperation between the stop protrusion and the long groove. In a case that the guide member is constructed, the movement stroke of the first shaft section 102 may be indirectly limited by limiting a movement stroke of the guide member. Then, the movement stroke of the guide member may be limited in a direct or indirect manner. In this regard, the present disclosure does not make a specific limitation, and adaptive construction and implementation may be performed according to an actual requirement.

In a specific implementation of the present disclosure, the foregoing external force is provided by a clutch drive mechanism, to drive the first shaft section 102 or the second shaft section 103 to move up and down. The clutch drive mechanism may be constructed in any appropriate manner. For example, the clutch drive mechanism may be constructed to include an actuating device that transmits power and the transmission device that transmits the power to the first shaft section 102. The actuating device may have various implementations, for example, one of many manners such as a manual manner, an electric manner, and an electromagnetic manner may be selected, or even two or more of the manner may be selected as long as technical obstacles are overcome. For example, both the manual manner and the electric manner may be selected, so that in a case of electric failure or power failure, the manual manner is used to ensure a normal function of the actuating device. Certainly, the transmission device may be selected from various implementations, for example, may be a pulling cable 4020, a pinion and rack transmission, a pinion transmission, a lead screw transmission, or a link transmission. In this regard, the present disclosure does not make a specific limitation, and an appropriate manner may be selected according to an actual requirement for implementation and construction.

An arrangement position of the clutch drive mechanism may be selected according to an actual case. For example, the clutch drive mechanism may be arranged in the steering column 105 in whole or in part, or may only pass through the steering column 105 to establish a transmission relationship with the first shaft section 102. In this regard, the present disclosure does not make a specific limitation, and an appropriate manner may still be selected according to an actual requirement for construction.

Based on this, those skilled in the art may understand that, without departing from the inventive concept of the present disclosure, in the various embodiments of the present disclosure, any one of the various specific implementations of the clutch structure may be selected and any one of the various specific implementations of the clutch drive mechanism may be selected for free combination. On this basis, an appropriate specific implementation of the guide structure and/or a specific implementation of the limiting mechanism may be selected to be combined with the clutch structure and the clutch drive mechanism, to obtain different embodiments.

Embodiments of the present disclosure are described in detail below with reference to the accompanying drawings.

Figure 10:
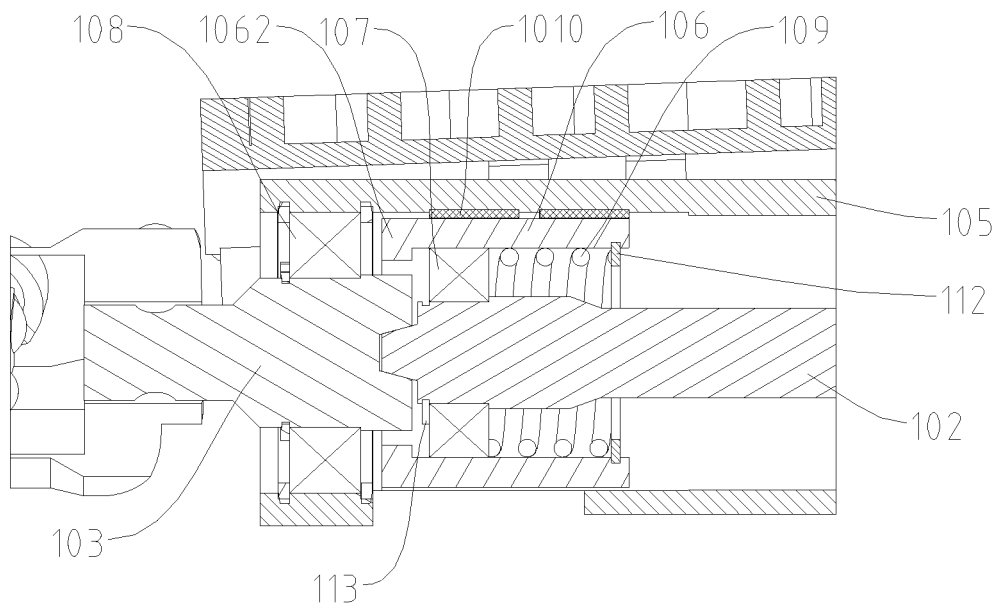
FIG. 10 shows an implementation of a clutch drive mechanism in the vehicle steering system according to the first embodiment of the present disclosure, showing that a first shaft section and a second shaft section are in an engaging state.
Figure 11:
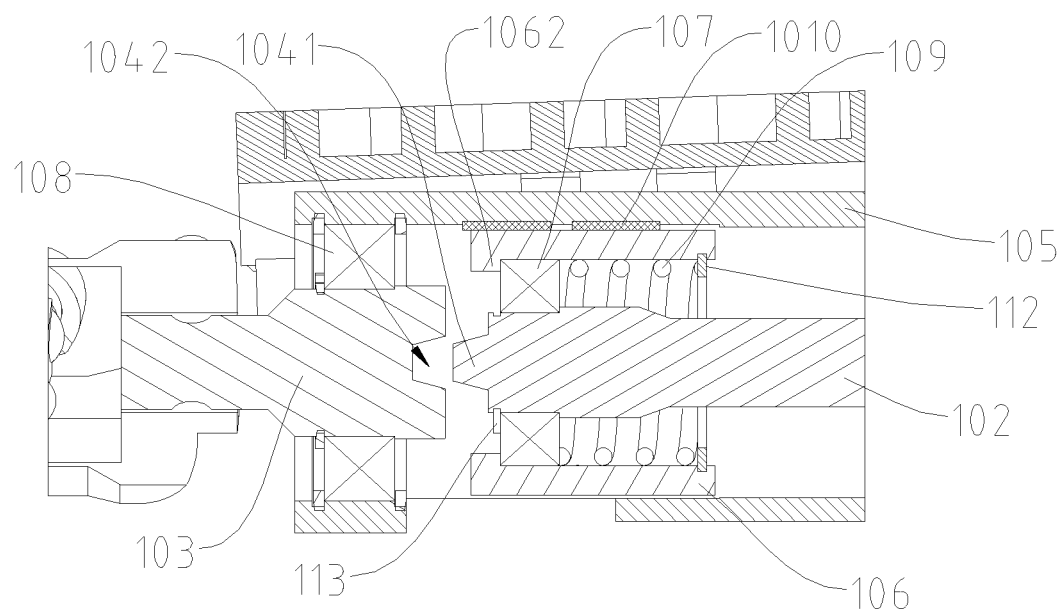
FIG. 11 shows an implementation of a clutch drive mechanism in the vehicle steering system according to the first embodiment of the present disclosure, showing that a first shaft section and a second shaft section are in a disengaging state.

Before the embodiments of the present disclosure are described in detail, it should be noted that, the same specific implementation of the clutch mechanism is used in a first embodiment and a second embodiment provided in the present disclosure, and may be considered as a first implementation. Referring to FIG. 10 and FIG. 11, the guide structure is provided in the clutch mechanism. The guide structure includes the sliding sleeve 106. The sliding sleeve 106 is arranged in the steering column 105, and is movable in the axial direction. The lateral movement of the sliding sleeve 106 relative to the steering column 105 is limited. The sliding sleeve 106 is supported in the steering column 105 by the sliding bearing 1010. The lower end of the first shaft section 102 is sleeved with a first bearing 107. The first bearing 107 is stopped by an elastic retaining ring 113. The first bearing is fixed at the lower end of the first shaft section 102. The first shaft section 102 is supported in the sliding sleeve 106 by the first bearing 107. The first shaft section 102 is movable in the axial direction in the sliding sleeve 106, so that the first shaft section 102 is movable in the axial direction relative to the sliding sleeve 106, while the second shaft section 103 is supported and fixed in the sliding sleeve 106 by a second bearing 108. That is, a downward movement of the sliding sleeve 106 can enable the first bearing 107 and the first shaft section 102 to move downward, thereby engaging the first shaft section 102 and the second shaft section 103; and an upward movement of the sliding sleeve 106 can enable the first bearing 107 and the first shaft section 102 to move upward, thereby disengaging the first shaft section 102 and the second shaft section 103. To enable the first shaft section 102 to follow the sliding sleeve 106 to move in the axial direction, the guide structure further includes an elastic biasing member 109, to provide the first shaft section 102 with an elastic force facing or away from the second shaft section 103 through the elastic biasing member 109, so that the first shaft section 102 is movable in the axial direction correspondingly when the sliding sleeve 106 moves in the axial direction, and the first shaft section 102 and the second shaft section 103 can switch between the engaging state and the disengaging state. In addition, the elastic biasing member 109 may allow the sliding sleeve 106 to have an invalid stroke, to reduce a design requirement of the external force. For example, if the sliding sleeve 106 is driven by the clutch drive mechanism to move, when the first shaft section 102 moves in position, the sliding sleeve 106 may continue to move under the driving of the clutch drive mechanism.

A radially inward stop rim 1062 used to stop the first bearing 107 is disposed at a port of the sliding sleeve 106 facing the second shaft section 103. The guide structure includes a stopper 112. An arrangement position of the stopper 112 may be set in any appropriate manner. In some embodiments, referring to FIG. 10 and FIG. 11, the stopper 112 is disposed (for example, fixed) on the upper end portion of the sliding sleeve 106. One end of the elastic biasing member 109 abuts against the first bearing 107, and the other end abuts against the stopper 112. In some other embodiments, referring to FIG. 12 and FIG. 13, the stopper 112 is disposed (for example, fixed) in the steering column 105. One end of the elastic biasing member 109 abuts against the first bearing 107, and the other end abuts against the stopper 112. The elastic biasing member 109 presses the first bearing 107 toward the stop rim 1062, to maintain the first shaft section 102 and the second shaft section 103 in the engaging state, thereby ensuring the transmission of a rotation from the steering wheel 5013 to the steering gear 5014.

Figure 2:
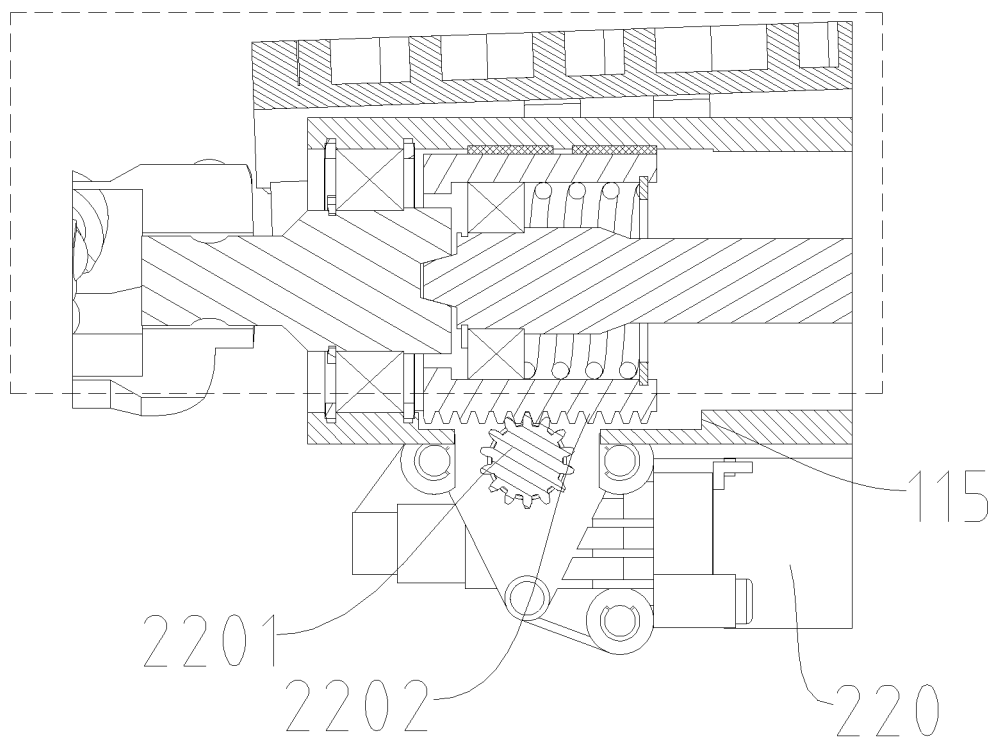
FIG. 2 is a schematic cross-sectional view of a partial structure of a vehicle steering system according to the first embodiment of the present disclosure, showing that a first shaft section and a second shaft section are in an engaging state.
Figure 3:
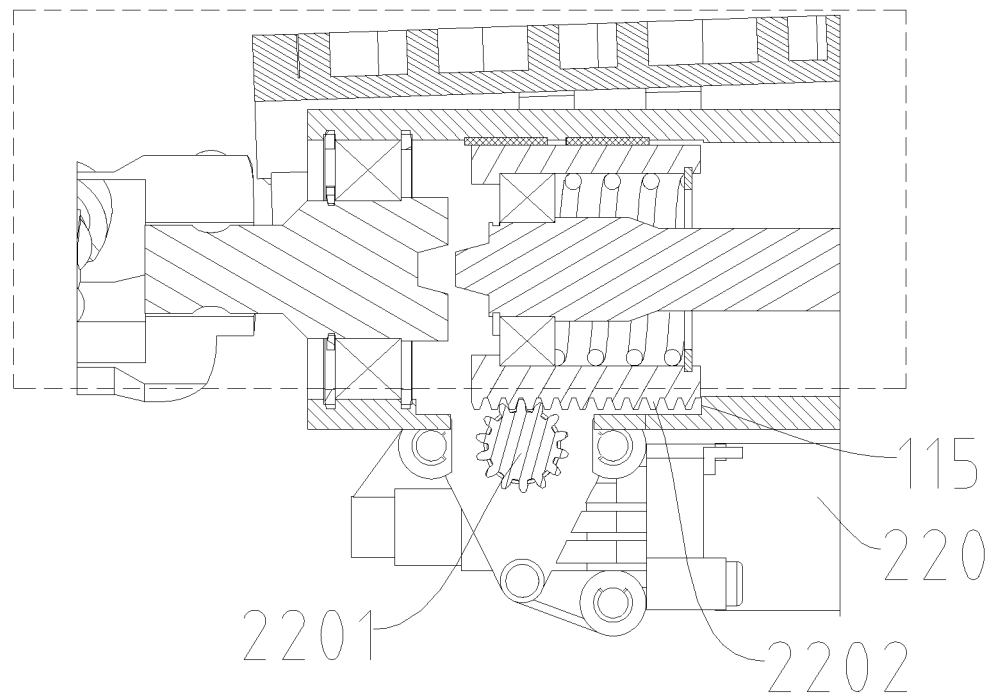
FIG. 3 is a schematic cross-sectional view of a partial structure of the vehicle steering system according to the first embodiment of the present disclosure, showing that a first shaft section and a second shaft section are in a disengaging state.
Figure 12:
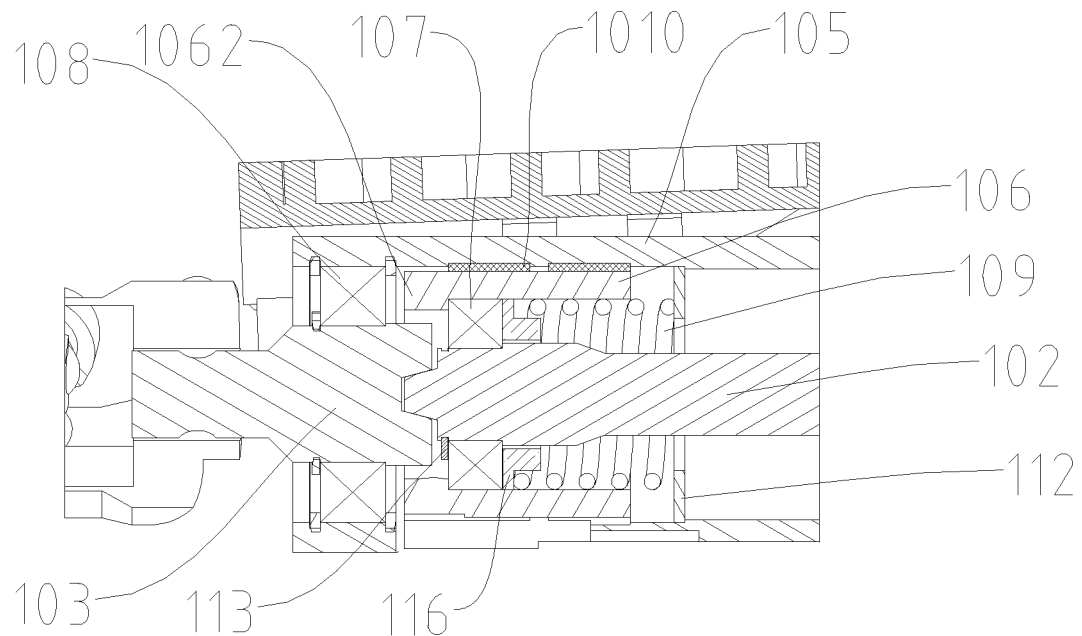
FIG. 12 shows an implementation of a clutch drive mechanism in the vehicle steering system according to the second embodiment of the present disclosure, showing that a first shaft section and a second shaft section are in an engaging state.
Figure 13:
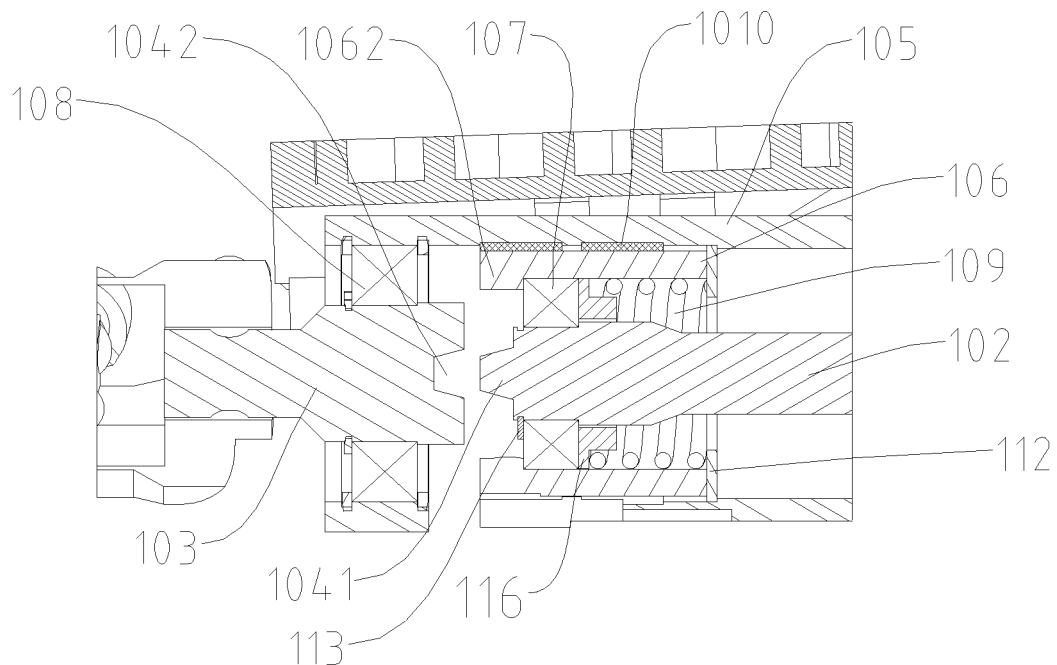
FIG. 13 shows another implementation of a clutch drive mechanism in a vehicle steering system according to the second embodiment of the present disclosure, showing that a first shaft section and a second shaft section are in a disengaging state.

The clutch mechanism includes a limiting structure. The limiting structure is used to constrain a movement stroke of the sliding sleeve 106 in the axial direction. Referring to FIG. 2 and FIG. 3, the limiting structure may be constructed as a limiting platform 115. When the first bearing 107 abuts against the stop rim 1062 and the first shaft section 102 and the second shaft section 103 are in the disengaging state, the sliding sleeve 106 abuts against the limiting platform 115, indicating that the sliding sleeve 106 has moved right (a direction in the drawing) to a limit position. Correspondingly, another limiting platform may be correspondingly disposed on a side of the sliding sleeve 106 corresponding to the second shaft section 103. When the sliding sleeve 106 abuts against the limiting platform, it indicates that the sliding sleeve 106 has moved left (a direction in the drawing) to a limit position. In this case, the clutch mechanism should be in the engaging state. The position of the limiting platform 115 may be set according to an arrangement position of the clutch mechanism. When the clutch mechanism is located in the steering column 105, the limiting platform 115 may be a stepped structure of a stroke on an inner surface of the steering column 105. Certainly, referring to FIG. 10, the second bearing 108 of the second shaft section 103 may be used as the limiting structure for the sliding sleeve 106 to move left to the limit position. In addition, as shown in FIG. 12 and FIG. 13, the foregoing stopper 112 is disposed (for example, fixed) on the steering column 105. In this case, the stopper 112 may be used as the limiting structure to limit a stroke of the sliding sleeve 106.

The clutch structure includes a male engagement portion 1041 and a female engagement portion 1042 mated with each other. The male engagement portion 1041 is formed at the lower end of the first shaft section 102, and is constructed as a protrusion axially protruding from a corresponding end surface. The female engagement portion 1042 is formed at the upper end of the second shaft section 103, and is constructed as a groove axially recessed in a corresponding end surface. For example, the protrusion may be a cross protrusion or a straight protrusion. Correspondingly, the groove may be a cross groove or a straight groove. The protrusion may be constructed as a wedge-shaped protrusion that tapers in a direction away from the corresponding end surface. The groove may be constructed as a wedge-shaped groove that tapers from a notch to a bottom of the groove. The shapes of the wedge-shaped protrusion and the wedge-shaped groove fit each other. When the male engagement portion 1041 and the female engagement portion 1042 are engaged and a pressing force is applied between the first shaft section 102 and the second shaft section 103, the protrusion and the groove can be fit tightly, so that a gap between the first shaft section 102 and the second shaft section 103 can be eliminated, thereby facilitating the reliable transmission of a torque. Mutual matching between the male engagement portion 1041 and the female engagement portion 1042 allows the first shaft section 102 and the second shaft section 103 to move in the axial direction relative to each other, that is, allows the first shaft section 102 and the second shaft section 103 to freely switch between the engaging state and the disengaging state.

Certainly, the male engagement portion 1041 and the female engagement portion 1042 may be constructed in any other appropriate manner. In some other embodiments of the clutch mechanism, the male engagement portion 1041 may be constructed as an external spline, and the female engagement portion 1042 may be constructed as an internal spline shaft hole. When the male engagement portion 1041 and the female engagement portion 1042 are engaged with each other, a transmission connection is established between the first shaft section 102 and the second shaft section 103, and a relative rotation cannot occur between the first shaft section and the second shaft section. In a process that the male engagement portion 1041 and the female engagement portion 1042 are switched from a state of the mutual matching to a detached state, the first shaft section 102 is movable in the axial direction relative to the second shaft section 103, so that the male engagement portion 1041 and the female engagement portion 1042 are separated from each other (that is, disengaged), thereby disconnecting the transmission connection between the steering wheel 5013 and the steering gear 5014.

The male engagement portion 1041 may be formed at the upper end of the second shaft section 103, and the female engagement portion 1042 may be formed at the lower end of the first shaft section 102. In this regard, the present disclosure does not make a specific limitation.

In a third embodiment provided in the present disclosure, a specific implementation of the clutch mechanism (which can be considered as a second implementation) is different from the first implementation in that the stopper 112 is disposed on an upper side of the sliding sleeve 106, and the stopper 112 may be fixed on the inner wall of the steering column 105 by an appropriate manner such as snap-fit.

Certainly, in other implementations of the clutch mechanism, the first bearing 107 may be fixed at the sliding sleeve 106. For example, an outer ring of the first bearing 107 is interference fit in the sliding sleeve 106, so that the first shaft section 102 and the sliding sleeve 106 are relatively fixed in the axial direction to move synchronously.

Figure 1:
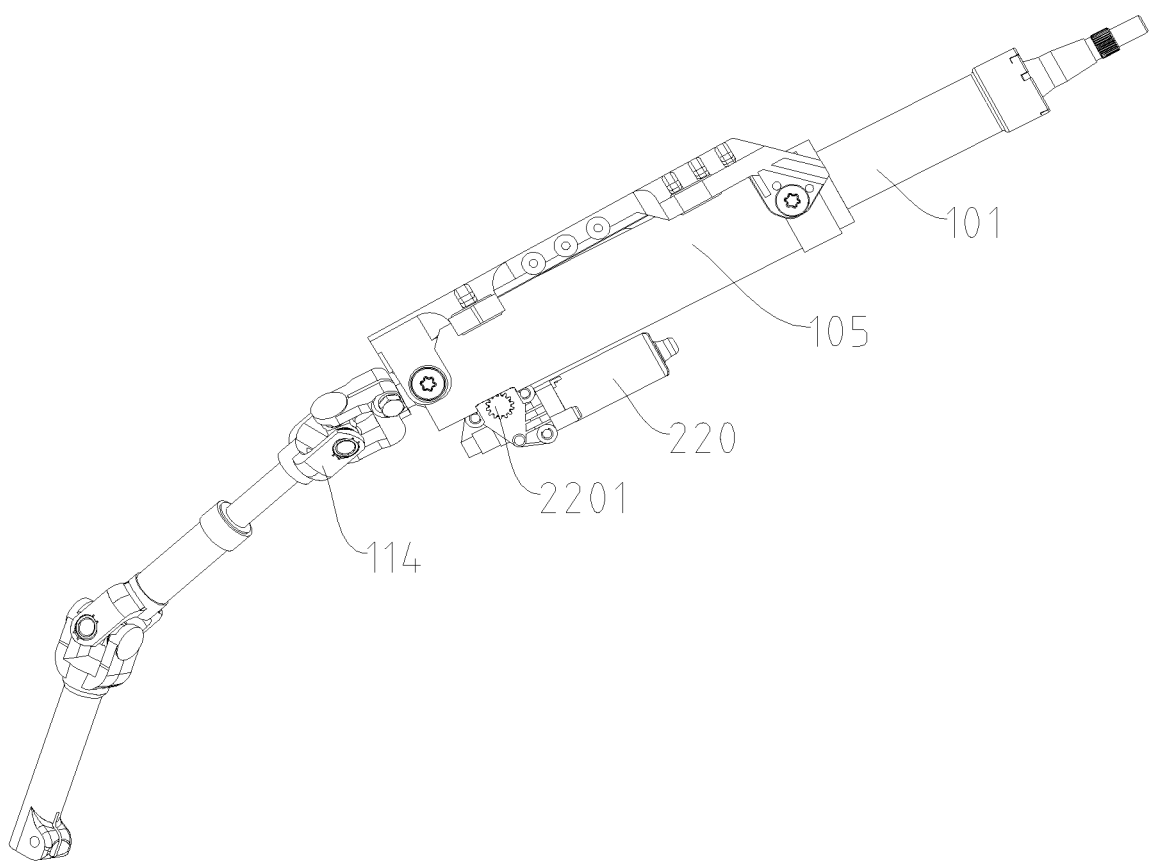
FIG. 1 is a schematic three-dimensional structural diagram of a vehicle steering system according to a first embodiment of the present disclosure.

In some implementations, with reference to FIG. 10 and FIG. 11, referring to FIG. 1 to FIG. 3, the clutch drive mechanism includes a motor 220 and a driving gear 2201. A driven rack 2202 is constructed on an outer surface of the sliding sleeve 106. An avoidance hole is provided in the steering column 105, so that the driving gear 2201 can mesh with the driven rack 2202.

It may be considered that the first shaft section 102 and the second shaft section 103 are initially in the disengaging state as shown in FIG. 3. In this case, the elastic biasing member 109 makes the first bearing 107 abut against the stop rim 1062. If the motor 220 drives the driving gear 2201 to rotate (in a counterclockwise direction shown in the drawing), the sliding sleeve 106 moves downward, and drives the first shaft section 102 to move downward synchronously. When the first shaft section 102 and the second shaft section 103 are in contact, switching from the disengaging state to the engaging state is completed. In this process, the elastic biasing member 109 is not deformed. If the motor 220 drives the driving gear 2201 to continue to rotate, the sliding sleeve 106 continues to move downward. In this case, the first shaft section 102 no longer follows the sliding sleeve to move in the axial direction, but the elastic biasing member 109 is compressed as the first bearing 107 and the stopper 112 move closer to each other. A resulting elastic force presses the first shaft section 102 toward the second shaft section 103 tightly, thereby providing a reliable engaging state between the first shaft section and the second shaft section, as shown in FIG. 2. Subsequently, when the sliding sleeve 106 abuts against the second bearing 108 and cannot continue to move, the motor 220 may stop working at this time.

However, if it is necessary to switch from the engaging state to the disengaging state (that is, from a state shown in FIG. 2 to a state shown in FIG. 3), the motor needs to drive the driving gear 2201 to rotate in an opposite direction (in a clockwise direction shown in the drawing). In this process, at the beginning, the first shaft section 102 does not move as the sliding sleeve 106 moves, but a movement of the sliding sleeve may enable the first bearing 107 and the stopper 112 to move away from each other, so that the elastic biasing member 109 restores deformation until the first bearing 107 abuts against the stop rim 1062. Subsequently, the first shaft section 102 starts to follow the sliding sleeve 106 to move synchronously, and then leaves the second shaft section 103, thereby switching from the engaging state to the disengaging state. When an upper end of the sliding sleeve 106 abuts against the limiting platform 115 disposed on the steering column 105, the motor 220 may stop rotating. The position of the sliding sleeve 106 can be maintained through a meshing relationship between the driving gear 2201 and the driven rack 2202. Therefore, the first shaft section 102 and the second shaft section 103 remain in the disengaging state.

Figure 4:
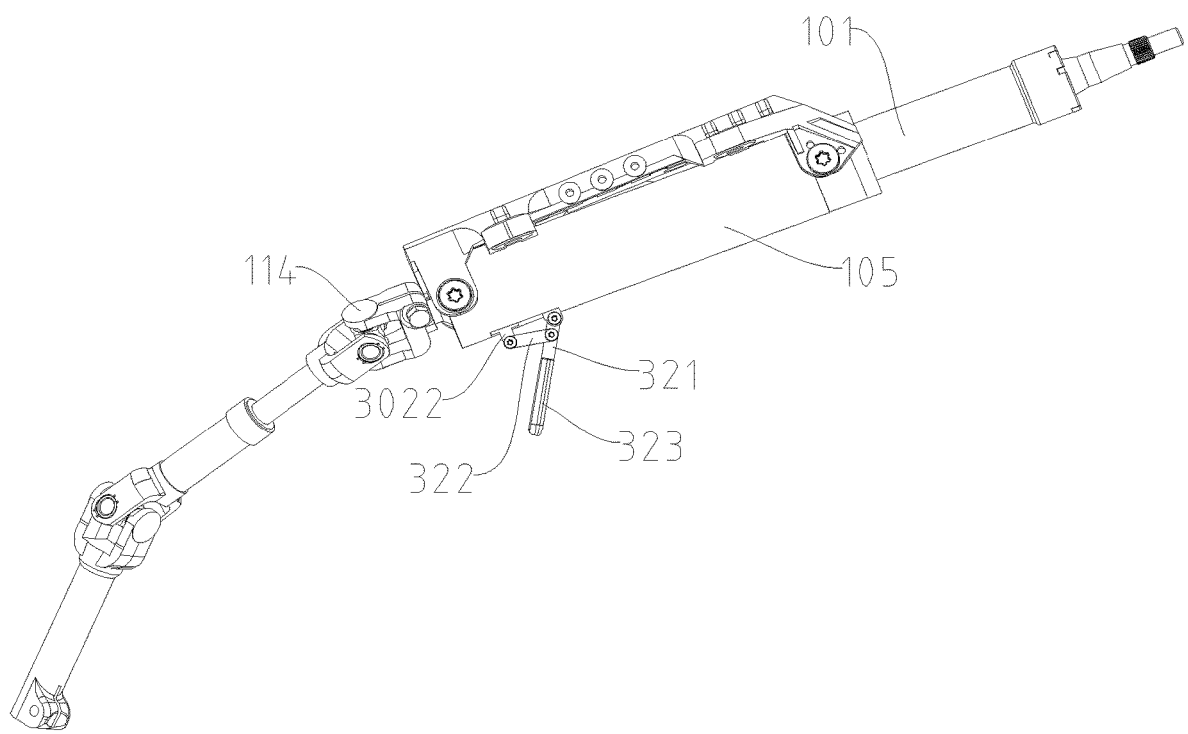
FIG. 4 is a schematic three-dimensional structural diagram of a vehicle steering system according to a second embodiment of the present disclosure.
Figure 5:
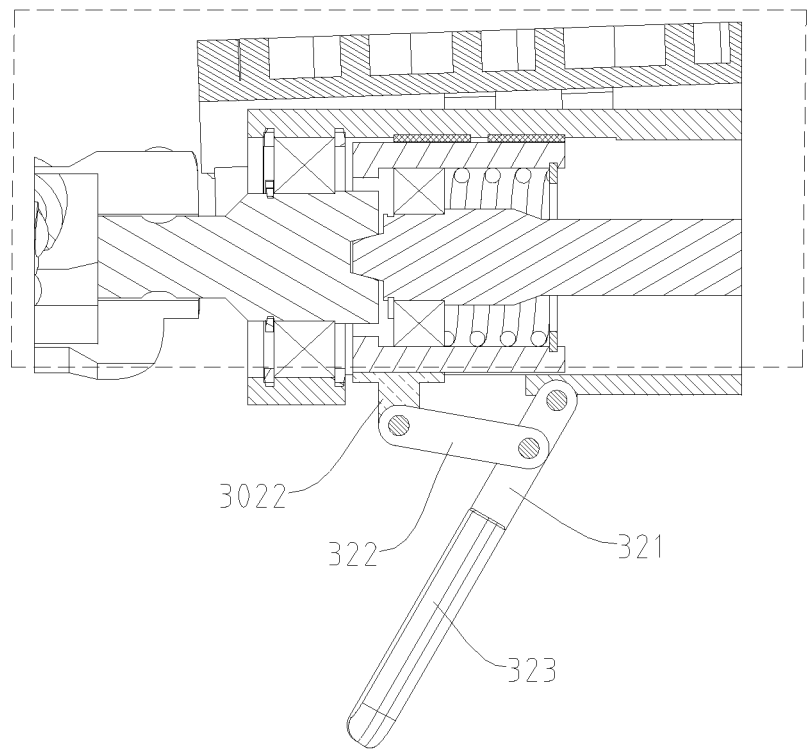
FIG. 5 is a schematic cross-sectional view of a partial structure of the vehicle steering system according to the second embodiment of the present disclosure, showing that a first shaft section and a second shaft section are in an engaging state.
Figure 6:
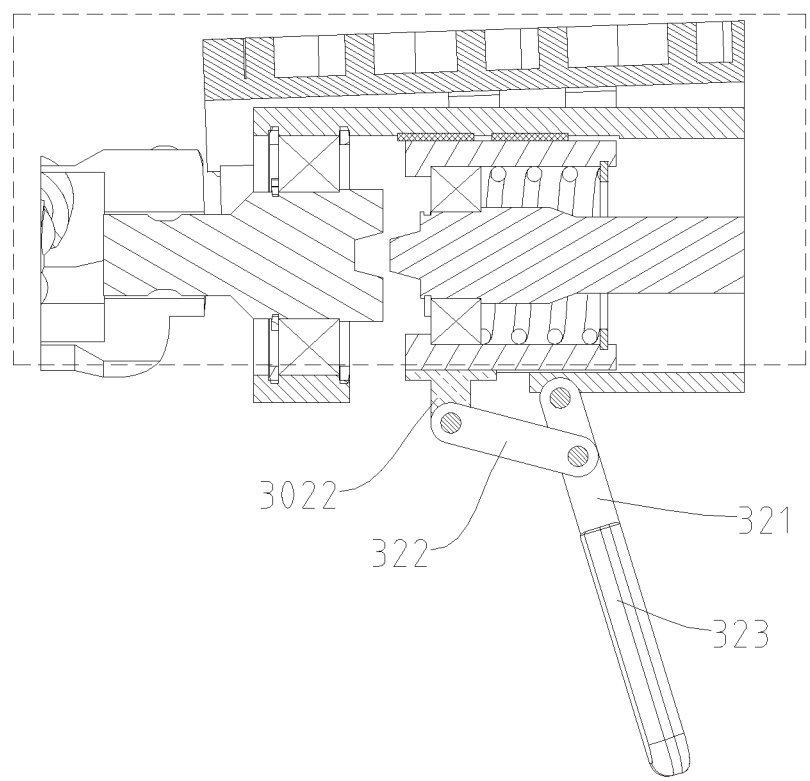
FIG. 6 is a schematic cross-sectional view of a partial structure of the vehicle steering system according to the second embodiment of the present disclosure, showing that a first shaft section and a second shaft section are in a disengaging state.

In some implementations, with reference to FIG. 10 and FIG. 11, referring to FIG. 4 to FIG. 6, the clutch drive mechanism is a manual drive, including a two-link structure that includes a first link 321 and a second link 322. A first end of the first link 321 is hinged to the steering column 105. The steering column 105 is provided with an avoidance hole. The outer surface of the sliding sleeve 106 is connected to a connection seat 3022 located in the avoidance hole. A first end of the second link 322 is hinged to the connection seat 3022. A second end of the second link 322 is hinged to the first link 321. In this way, the two-link structure and the sliding sleeve 106 are constructed as a crank-slider structure. A second end of the first link 321 is constructed as a grip handle 323 for use as the actuating device. The first link 321 is driven to rotate around a hinge shaft of the first link, so that the second link 322 moves together with the connection seat 3022 and the sliding sleeve 106 in the axial direction, and the first shaft section 102 moves in the axial direction.

Specifically, with reference to FIG. 5 and FIG. 10, as shown in FIG. 6 and FIG. 11, when the first shaft section 102 and the second shaft section 103 are in the disengaging state shown in FIG. 6, the elastic biasing member 109 makes the first bearing 107 abut against the stop rim 1062. If the grip handle 323 rotates (in a clockwise direction shown in the drawing), the sliding sleeve 106 moves downward, and drives the first shaft section 102 to move downward synchronously. When the first shaft section 102 and the second shaft section 103 are in contact, switching from the disengaging state to the engaging state is completed. In this process, the elastic biasing member 109 is not deformed. If the grip handle 323 continues to rotate, the sliding sleeve 106 continues to move downward. In this case, the first shaft section 102 no longer follows the sliding sleeve to move in the axial direction, but the elastic biasing member 109 is compressed as the first bearing 107 and the stopper 112 move closer to each other. A resulting elastic force presses the first shaft section 102 toward the second shaft section 103 tightly, thereby providing a reliable engaging state between the first shaft section and the second shaft section, as shown in FIG. 5. Subsequently, when the sliding sleeve 106 abuts against the second bearing 108, the sliding sleeve cannot continue to move. In this case, the grip handle 323 cannot continue to rotate. The grip handle may be locked by a locking mechanism, to maintain the position of the grip handle 323, so that this state of the clutch mechanism (the first shaft section 102 and the second shaft section 103 are in the engaging state, and the elastic biasing member 109 is compressed) is therefore maintained.

However, if it is necessary to switch from the engaging state to the disengaging state (that is, from a state shown in FIG. 5 to a state shown in FIG. 6), the grip handle 323 needs to rotate in an opposite direction (in a counterclockwise direction shown in the drawing). In this process, at the beginning, the first shaft section 102 does not move as the sliding sleeve 106 moves, but a movement of the sliding sleeve 106 may enable the first bearing 107 and the stopper 112 to move away from each other, so that the elastic biasing member 109 restores deformation until the first bearing 107 abuts against the stop rim 1062. Subsequently, the first shaft section 102 starts to follow the sliding sleeve 106 to move synchronously, and then leaves the second shaft section 103, thereby switching from the engaging state to the disengaging state. When an upper end of the sliding sleeve 106 abuts against the limiting platform 115 disposed on the steering column 105, the grip handle 323 cannot continue to rotate. In this case, the grip handle 323 may be locked by the locking mechanism, to maintain the position of the sliding sleeve 106. Therefore, the first shaft section 102 and the second shaft section 103 remain in the disengaging state. Therefore, the limiting platform 115 is used as the foregoing limiting mechanism.

Figure 7:
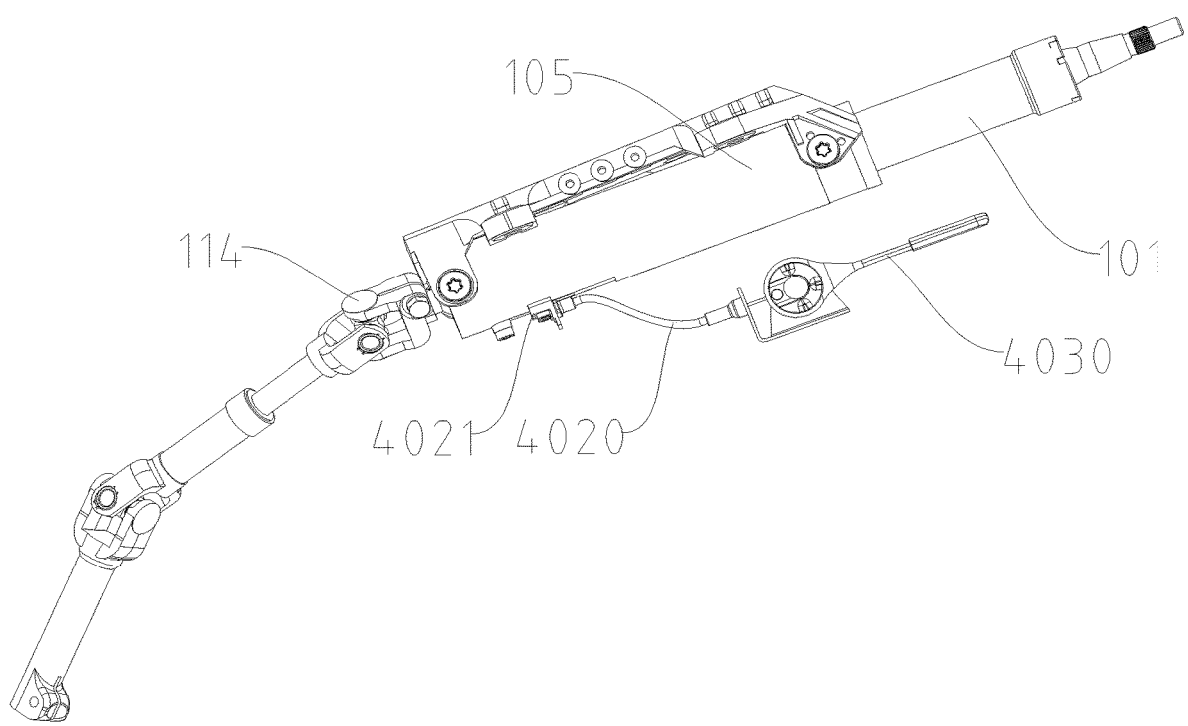
FIG. 7 is a schematic three-dimensional structural diagram of a vehicle steering system according to a third embodiment of the present disclosure.
Figure 8:
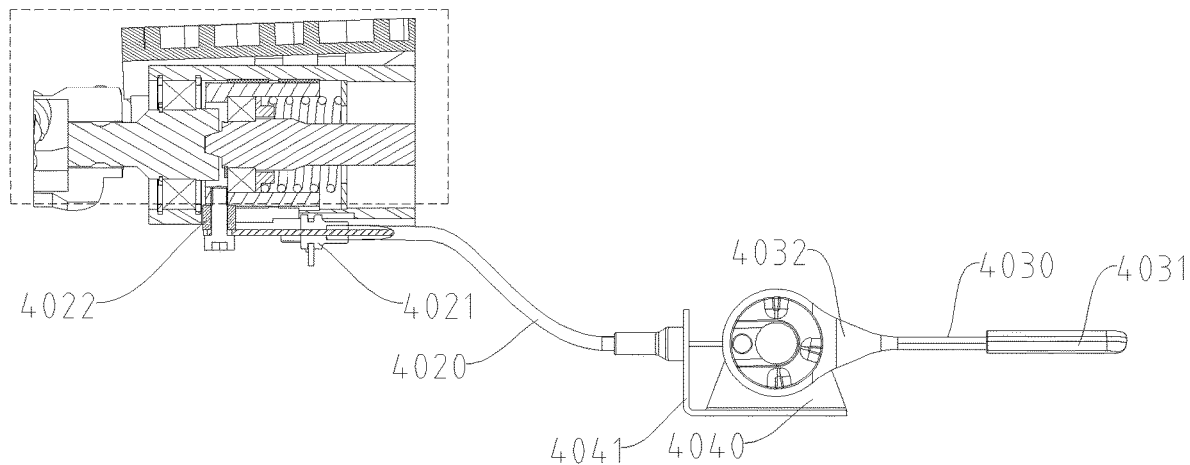
FIG. 8 is a schematic cross-sectional view of a partial structure of the vehicle steering system according to the third embodiment of the present disclosure, showing that a first shaft section and a second shaft section are in an engaging state.
Figure 9:
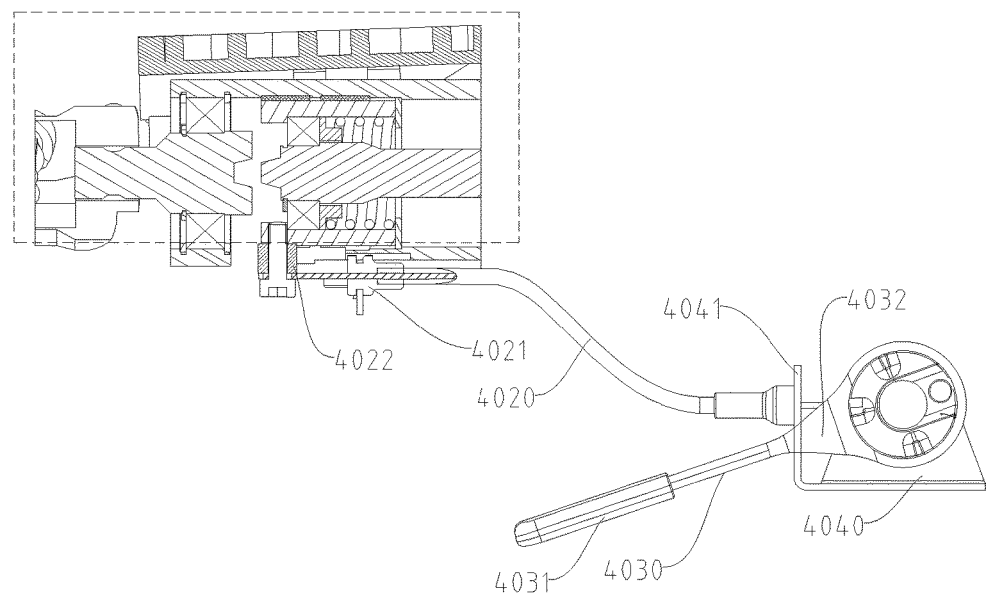
FIG. 9 is a schematic cross-sectional view of a partial structure of the vehicle steering system according to the third embodiment of the present disclosure, showing that a first shaft section and a second shaft section are in a disengaging state.

In some implementations with reference to FIG. 12 and FIG. 13, referring to FIG. 7 to FIG. 9, the outer surface of the sliding sleeve 106 is connected to a spacer block 4022 located in the avoidance hole. A pulling cable 4020 includes an outer sheath and a cable core. A distal end portion of the cable core protrudes from the outer sheath, and is connected to the spacer block 4022. A distal end portion of the outer sheath is fixed on an outer side of the steering column 105 by a pulling cable bracket 4021. A proximal end portion of the outer sheath is fixed on a fixing bracket 4041 of a mounting seat 4040. A proximal end portion of the cable core protrudes from the outer sheath, and is connected to the actuating device that is constructed as a control handle 4030 connected to the mounting seat 4040. The actuating device drives the cable core, so that the cable core moves linearly in the outer sheath, to transmit power of the actuating device to the distal end portion of the cable core through the proximal end portion of the cable core, thereby driving the sliding sleeve 106 to move in the axial direction. It should be noted herein that, directional words "proximal" and "distal" in the "proximal end portion" and "distal end portion" are defined relative to the position of the actuating device. An orientation close to the actuating device is "proximal", or otherwise the orientation is "distal".

In an embodiment, the control handle 4030 includes two opposite ends. One end is constructed as a gripping portion 4031, and the other end is constructed as a connecting portion 4032. The proximal end portion of the cable core is fixed at the connecting portion 4032. The control handle 4030 is connected to the mounting seat 4040 by a pivot shaft between the gripping portion 4031 and the connecting portion 4032, to form a lever structure in which the pivot shaft is a fulcrum, and the control handle 4030 rotates around the pivot shaft, to drive the cable core to move in the outer sheath, to cause the first shaft section 102 to move in the axial direction. In another embodiment, the control handle 4030 includes two opposite ends. One end is constructed as the gripping portion 4031, and the other end is constructed as the connecting portion 4032. The proximal end portion of the cable core is fixed at the connecting portion 4032. The connecting portion 4032 is constructed with a winding drum. The proximal end portion of the cable core is fixed to the winding drum. The connecting portion 4032 is connected to the mounting seat 4040 by the pivot shaft. A central axis of the pivot shaft is collinear with a central axis of the winding drum, so that when the control handle 4030 rotates around the pivot shaft, the cable core is wound around the winding drum or released from the winding drum, to implement a movement in the outer sheath, and therefore the sliding sleeve 106 moves in the axial direction.

Figure 14:
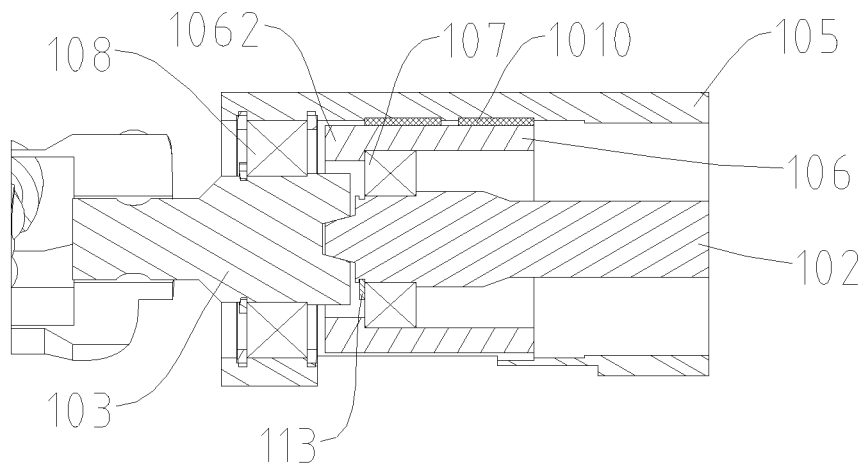
FIG. 14 shows another implementation of a clutch drive mechanism in a vehicle steering system according to an embodiment of the present disclosure, showing that a first shaft section and a second shaft section are in an engaging state.

It may be considered that the first shaft section 102 and the second shaft section 103 are initially in the disengaging state shown in FIG. 9 and FIG. 13. In this case, the control handle 4030 and the pulling cable 4020 maintain the sliding sleeve 106 in a state of abutting against the stopper 112. The elastic biasing member 109 is compressed, and makes the first bearing 107 abut against a lower stop rim 1062. If the control handle 4030 is rotated in a counterclockwise direction in the drawing, the pulling cable 4020 is released, and the elastic biasing member 109 can restore deformation and enable the first bearing 107 to move downward, to cause the first shaft section 102 to move downward to engage with the second shaft section 103, as shown in FIG. 10 and FIG. 14. In this case, the control handle 4030 may be locked by a locking mechanism, thereby maintaining the first shaft section 102 and the second shaft section 103 in the engaging state. Subsequently, if the control handle 4030 is rotated in a clockwise direction in the drawing, the pulling cable 4020 is tightened, drives the sliding sleeve 106 to move upward, and then drives the first bearing 107 and the first shaft section 102 to move upward through the lower stop rim 1062. In addition, the elastic biasing member 109 is compressed, and the first shaft section 102 leaves the second shaft section 103 and continues to move upward until the sliding sleeve 106 abuts against the stopper 112 (referring to FIG. 9 and FIG. 13). The sliding sleeve 106 cannot continue to move. In this case, the control handle 4030 may be locked by the locking mechanism, to maintain the first shaft section 102 and the second shaft section 103 in the disengaging state.

In this embodiment, the avoidance hole may be constructed to limit a movement stroke of the spacer block 4022 for use as a limiting mechanism. The avoidance hole extends in the axial direction on an outer surface of the steering column 105, and a movement range of the spacer block 4022 in the axial direction is limited by an extension length of the avoidance hole in the axial direction.

Figure 15:
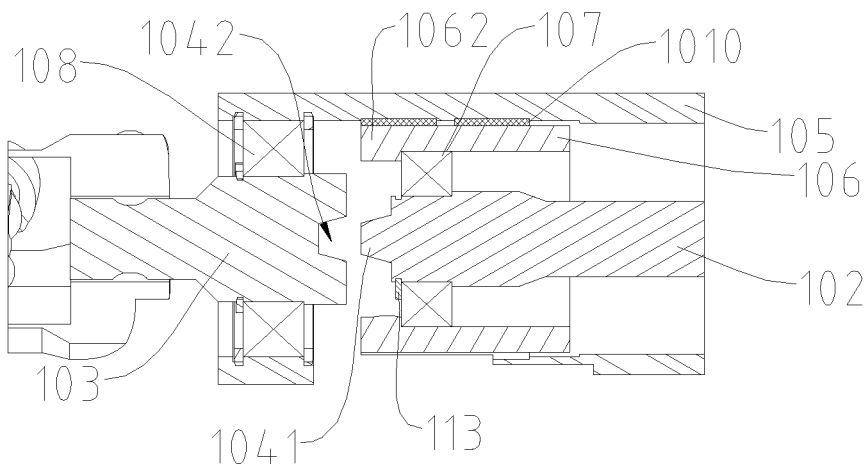
FIG. 15 shows another implementation of a clutch drive mechanism in a vehicle steering system according to an embodiment of the present disclosure, showing that a first shaft section and a second shaft section are in a disengaging state.

In addition, in the embodiments of a vehicle steering system 501 provided in the present disclosure, a clutch mechanism shown in FIG. 14 and FIG. 15 may be used.

As shown in FIG. 14 and FIG. 15, the first shaft section 102 is fixedly supported in the sliding sleeve 106 by the first bearing 107. The first bearing 107 is limited by the stop rim 1062. The sliding sleeve 106 is slidably supported in the steering column 105 by a sliding bearing 1010. The second shaft section 103 is fixedly supported in the steering column 105 by the second bearing 108. An end portion of the first shaft section 102 facing the second shaft section 103 is provided with the male engagement portionengagement portion 1041. An end portion of the second shaft section 103 facing the first shaft section 102 is provided with the female engagement portion 1042.

The first shaft section 102 is axially fixed relative to the sliding sleeve 106. Therefore, when the clutch drive mechanism drives the sliding sleeve 106 to move in the axial direction, the first shaft section 102 moves synchronously in the axial direction. Therefore, the control of the clutch drive mechanism may control the movement of the first shaft section 102 in the axial direction, to control a state of the clutch mechanism.

In addition, based on the foregoing technical solution, the present disclosure further provides a vehicle 500, the vehicle 500 includes the foregoing vehicle steering system 501.

The preferred implementations of the present disclosure are described in detail above with reference to the accompanying drawings. However, the present disclosure is not limited to the specific details in the foregoing implementations, multiple simple deformations may be made to the technical solution of the present disclosure within a range of the technical concept of the present disclosure, and these simple deformations fall within the protection scope of the present disclosure.

Additionally, it should be noted that, the specific technical features described in the above specific implementations may be combined in any appropriate manner without contradiction. To avoid unnecessary repetition, various possible combinations are not further described in the present disclosure.

In addition, various different implementations of the present disclosure may alternatively be combined randomly. Such combinations should also be considered as the content disclosed in the present disclosure provided that these combinations do not depart from the concept of the present disclosure.

What is claimed is:

1. A vehicle steering system, the vehicle steering system comprising a steering shaft and a steering transmission shaft, wherein the steering shaft or the steering transmission shaft comprises a first shaft section and a second shaft section, a clutch mechanism is arranged between the first shaft section and the second shaft section, the clutch mechanism has an engaging state and a disengaging state, and one of the first shaft section and the second shaft section is movable in an axial direction relative to the other under an action of an external force, to implement switching between the engaging state and the disengaging state;

in the engaging state, a transmission connection is established between the first shaft section and the second shaft section, and in this case, a controller determines that a vehicle enters a driving mode; and in the disengaging state, the transmission connection between the first shaft section and the second shaft section is disconnected, and in this case, the controller determines that the vehicle enters a game mode.

2. The vehicle steering system according to claim 1, wherein the second shaft section is fixedly disposed relative to a steering column, the first shaft section is movable in the axial direction relative to the second shaft section and the steering column, the clutch mechanism comprises a guide structure, and the guide structure constrains and guides the first shaft section to move in the axial direction.

3. The vehicle steering system according to claim 2, wherein the steering shaft comprises an upper shaft and a lower shaft, an upper end of the upper shaft is connected to a steering wheel, a lower end of the lower shaft is connected to the steering transmission shaft, and the guide structure is provided in the steering column:

the upper shaft is used as the first shaft section, the lower shaft is used as the second shaft section, and the upper shaft and the lower shaft are connected by the clutch mechanism; or, a lower end of the upper shaft and an upper end of the lower shaft are in a transmission connection, the upper shaft is movable in the axial direction relative to the lower shaft, the lower shaft comprises the first shaft section and the second shaft section, an upper end of the first shaft section is connected to the upper shaft, a lower end of the first shaft section is connected to an upper end of the second shaft section by the clutch mechanism, and the first shaft section is movable in the axial direction relative to the second shaft section; or, the upper shaft comprises the first shaft section and the second shaft section, an upper end of the second shaft section is connected to the steering wheel, a lower end of the second shaft section is connected to an upper end of the first shaft section by the clutch mechanism, and the first shaft section is movable in the axial direction relative to the second shaft section.

4. The vehicle steering system according to claim 2, wherein the guide structure comprises a sliding sleeve, wherein the sliding sleeve is arranged in the steering column and is movable in the axial direction, a lateral movement of the sliding sleeve relative to the steering column is limited, a first bearing is fixed at the lower end of the first shaft section, and the first shaft section is supported in the sliding sleeve by the first bearing, and the vehicle steering system comprises a clutch drive mechanism, and the clutch drive mechanism drives the sliding sleeve to move, to cause the first shaft section to move in the axial direction.

5. The vehicle steering system according to claim 4, wherein the first shaft section is movable in the axial direction relative to the sliding sleeve, a radially inward stop rim is disposed at a port of the sliding sleeve facing the second shaft section and is used to stop the first bearing, and an elastic biasing member is arranged in the steering column, to press the first bearing towards the stop rim.

6. The vehicle steering system according to claim 5, wherein the guide structure comprises a stopper, the stopper is fixed at an upper end portion of the sliding sleeve, or the stopper is fixed at the steering column, one end of the elastic biasing member abuts against the first bearing, and the other end abuts against the stopper.

7. The vehicle steering system according to claim 4, wherein the first shaft section and the sliding sleeve are relatively fixed in the axial direction.

8. The vehicle steering system according to claim 7, wherein an outer ring of the first bearing is interference fit in the sliding sleeve.

9. The vehicle steering system according to claim 4, wherein the clutch mechanism comprises a limiting structure, and the limiting structure constrains a movement stroke of the sliding sleeve in the axial direction.

10. The vehicle steering system according to claim 4, wherein the clutch drive mechanism comprises an actuating device and a transmission device, the actuating device is arranged on an outer side of the steering column, the actuating device passes through an avoidance hole through the transmission device, the avoidance hole is provided in the steering column, the actuating device is connected to the sliding sleeve in a transmission manner, and the actuating device drives the sliding sleeve to move.

11. The vehicle steering system according to claim 1, wherein the clutch mechanism comprises a clutch structure, wherein the clutch structure comprises a male engagement portion and a female engagement portion mated with each other, one of the male engagement portion and the female engagement portion is formed at the lower end of the first shaft section, the other of the male engagement portion and the female engagement portion is formed at the upper end of the second shaft section, and when the male engagement portion and the female engagement portion are engaged, the first shaft section and the second shaft section are in the engaging state.

12. A vehicle, the vehicle comprising the vehicle steering system according to claim 1.

13. The vehicle steering system according to claim 3, wherein the guide structure comprises a sliding sleeve, wherein the sliding sleeve is arranged in the steering column and is movable in the axial direction, a lateral movement of the sliding sleeve relative to the steering column is limited, a first bearing is fixed at the lower end of the first shaft section, and the first shaft section is supported in the sliding sleeve by the first bearing, and the vehicle steering system comprises a clutch drive mechanism, and the clutch drive mechanism drives the sliding sleeve to move, to cause the first shaft section to move in the axial direction.

14. The vehicle steering system according to claim 13, wherein the first shaft section is movable in the axial direction relative to the sliding sleeve, a radially inward stop rim is disposed at a port of the sliding sleeve facing the second shaft section and is used to stop the first bearing, and an elastic biasing member is arranged in the steering column, to press the first bearing towards the stop rim.

15. The vehicle steering system according to claim 14, wherein the guide structure comprises a stopper, the stopper is fixed at an upper end portion of the sliding sleeve, or the stopper is fixed at the steering column, one end of the elastic biasing member abuts against the first bearing, and the other end abuts against the stopper.

16. The vehicle steering system according to claim 13, wherein the first shaft section and the sliding sleeve are relatively fixed in the axial direction;
  wherein an outer ring of the first bearing is interference fit in the sliding sleeve;
  wherein the clutch mechanism comprises a limiting structure, and the limiting structure constrains a movement stroke of the sliding sleeve in the axial direction.

17. The vehicle steering system according to claim 16, wherein the clutch drive mechanism comprises an actuating device and a transmission device, the actuating device is arranged on an outer side of the steering column, the actuating device passes through an avoidance hole through the transmission device, the avoidance hole is provided in the steering column, the actuating device is connected to the sliding sleeve in a transmission manner, and the actuating device drives the sliding sleeve to move.

18. The vehicle steering system according to claim 17, wherein the clutch mechanism comprises a clutch structure, wherein the clutch structure comprises a male engagement portion and a female engagement portion mated with each other, one of the male engagement portion and the female engagement portion is formed at the lower end of the first shaft section, the other of the male engagement portion and the female engagement portion is formed at the upper end of the second shaft section, and when the male engagement portion and the female engagement portion are engaged, the first shaft section and the second shaft section are in the engaging state.

19. The vehicle steering system according to claim 2, wherein the clutch mechanism comprises a clutch structure, wherein the clutch structure comprises a male engagement portion and a female engagement portion mated with each other, one of the male engagement portion and the female engagement portion is formed at the lower end of the first shaft section, the other of the male engagement portion and the female engagement portion is formed at the upper end of the second shaft section, and when the male engagement portion and the female engagement portion are engaged, the first shaft section and the second shaft section are in the engaging state.

20. The vehicle steering system according to claim 3, wherein the clutch mechanism comprises a clutch structure, wherein the clutch structure comprises a male engagement portion and a female engagement portion mated with each other, one of the male engagement portion and the female engagement portion is formed at the lower end of the first shaft section, the other of the male engagement portion and the female engagement portion is formed at the upper end of the second shaft section, and when the male engagement portion and the female engagement portion are engaged, the first shaft section and the second shaft section are in the engaging state.

* * * * *